United States Patent
Matsumoto et al.

(10) Patent No.: US 10,001,074 B2
(45) Date of Patent: Jun. 19, 2018

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventors: Yosuke Matsumoto, Susono (JP); Noriyasu Adachi, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 102 days.

(21) Appl. No.: 15/132,517

(22) Filed: Apr. 19, 2016

(65) Prior Publication Data
US 2016/0363071 A1    Dec. 15, 2016

(30) Foreign Application Priority Data

Jun. 9, 2015  (JP) .................................. 2015-116823

(51) Int. Cl.
*F02D 23/00* (2006.01)
*F01N 5/04* (2006.01)
(Continued)

(52) U.S. Cl.
CPC ....... *F02D 41/0275* (2013.01); *F01N 3/0814* (2013.01); *F01N 3/0842* (2013.01);
(Continued)

(58) Field of Classification Search
CPC ............. F02D 41/0275; F02D 41/0002; F02D 41/0007; F02D 41/146; F02D 41/1475;
(Continued)

(56) References Cited

U.S. PATENT DOCUMENTS 5,249,484 A * 10/1993 Matsuoka ............. B60W 30/18
477/121
6,192,675 B1 * 2/2001 Hirota ..................... F02B 37/18
60/286
(Continued)

FOREIGN PATENT DOCUMENTS

| JP | 2001-234751 A | | 8/2001 |
| JP | 2006-291897 A | | 10/2006 |
| JP | 2013096346 A | * | 5/2013 |

*Primary Examiner* — Thai Ba Trieu
(74) *Attorney, Agent, or Firm* — Hunton Andrews Kurth LLP (57) ABSTRACT

According to first quantity of state control, a rich spike is executed while actuating a WGV so as to decrease turbocharging pressure, and after completion of the rich spike, the WGV is actuated to raise the turbocharging pressure again, the combustion air-fuel ratio is adjusted to the theoretical air-fuel ratio while suppressing an air amount by a throttle so as not to vary shaft torque until the turbocharging pressure is restored, and upon the turbocharging pressure being restored the air amount is increased by the throttle and the combustion air-fuel ratio is returned to a lean air-fuel ratio. According to second quantity of state control, a rich spike is executed while actuating the WGV so as to maintain the turbocharging pressure, and after completion of the rich spike, the air amount is increased by the throttle and the combustion air-fuel ratio is returned to a lean air-fuel ratio.

2 Claims, 7 Drawing Sheets (51) Int. Cl.
*F01N 3/00* (2006.01)
*F02D 41/02* (2006.01)
*F01N 3/08* (2006.01)
*F02D 41/14* (2006.01)
*F02B 37/00* (2006.01)
*F02B 37/12* (2006.01)
*F02B 37/24* (2006.01)
*F02D 41/00* (2006.01)
*F02B 37/18* (2006.01)

(52) U.S. Cl.
CPC .............. *F02B 37/00* (2013.01); *F02B 37/12* (2013.01); *F02B 37/183* (2013.01); *F02B 37/24* (2013.01); *F02D 41/0002* (2013.01); *F02D 41/0007* (2013.01); *F02D 41/146* (2013.01); *F02D 41/1475* (2013.01); *F02D 2200/0406* (2013.01); *F02D 2200/0625* (2013.01); *Y02T 10/144* (2013.01); *Y02T 10/42* (2013.01)

(58) Field of Classification Search
CPC ........... F02D 2200/0406; F01N 3/0814; F01N 3/0842; F01N 2560/026; F02B 37/00; F02B 37/12; F02B 37/183; F02B 37/24; Y02T 10/144; Y02T 10/42
USPC .......... 60/602, 280, 285, 286, 289, 295, 297
See application file for complete search history.

(56) References Cited

U.S. PATENT DOCUMENTS

| | | | |
|---|---|---|---|
| 6,279,551 B1* | 8/2001 | Iwano | F02B 37/18 123/564 |
| 6,502,391 B1* | 1/2003 | Hirota | F01N 3/0814 60/288 |
| 6,866,610 B2* | 3/2005 | Ito | F02D 41/0215 477/43 |
| 7,540,146 B2* | 6/2009 | Narita | F01N 3/0842 60/286 |
| 7,565,798 B2* | 7/2009 | Kawai | F01N 3/0814 60/278 |
| 7,591,130 B2* | 9/2009 | Ito | F02D 41/0215 60/295 |
| 7,753,039 B2* | 7/2010 | Harima | F01N 3/0842 123/443 |
| 7,765,793 B2* | 8/2010 | Nishiyama | B01D 53/9431 60/280 |
| 8,511,065 B2* | 8/2013 | Greszler | F01N 3/208 60/280 |
| 2008/0041034 A1* | 2/2008 | Hosoi | F02D 41/0025 60/299 |
| 2015/0034167 A1* | 2/2015 | David | F01N 3/2046 137/3 |
| 2016/0258373 A1* | 9/2016 | Tanaka | F01N 3/0814 |
| 2016/0363070 A1* | 12/2016 | Hotta | F02D 41/0047 |
| 2017/0009676 A1* | 1/2017 | Sano | F02D 41/0007 |
| 2017/0113690 A1* | 4/2017 | Kim | F02D 41/1475 |

* cited by examiner

CONTROL APPARATUS FOR INTERNAL COMBUSTION ENGINE

CROSS-REFERENCE TO RELATED APPLICATION

The present application claims priority to Japanese Patent Application No. 2015-116823 filed on Jun. 9, 2015, which is incorporated herein by reference in its entirety.

BACKGROUND

Field of the Invention

The present invention relates to a control apparatus for an internal combustion engine that is capable of lean burn operation according to an air-fuel ratio that is leaner in fuel than a theoretical air-fuel ratio in an operating region in which turbocharging by a turbocharger is performed.

Background Art

In JP2006-291897A, technology is disclosed that relates to a rich spike in a diesel engine equipped with a turbocharger that has a variable nozzle. According to the aforementioned technology, during a period in which a rich spike is being performed, the variable nozzle is actuated to decrease a turbocharging pressure and an intake throttle valve is also closed to reduce an air amount. Further, prior to the end of the rich spike, the variable nozzle is actuated to increase the turbocharging pressure, and after the turbocharging pressure is increased the intake throttle valve is opened to increase the air amount.

SUMMARY OF THE APPLICATION

According to the above described technology, by opening the intake throttle valve after increasing the turbocharging pressure in advance, an air amount can be increased with good response when switching to lean burn operation. Such a technique is advantageous in a diesel engine in the respect that misfiring due to excessive EGR gas can be prevented by preventing a shortage with respect to the air amount. Further, if the above described technology is applied to a rich spike in a gasoline engine, there is the advantage that a deterioration in exhaust performance can be suppressed because it is possible to shorten a dwelling time in a specific air-fuel ratio region (A/F 16 to 20) in which the amount of NOx emissions becomes particularly large when switching to lean burn operation. However, if a period in which the turbocharging pressure is increased in advance is long, fuel consumption performance will decrease due to a delay in switching to lean burn operation.

The present application has been conceived in consideration of the above described problem, and has an object to provide a control apparatus for an internal combustion engine that can suppress a deterioration in fuel consumption performance due to a rich spike in an operating region in which turbocharging by a turbocharger is performed, while increasing an air amount with good response when switching to lean burn operation after the end of the rich spike.

A control apparatus for an internal combustion engine according to the present disclosure is a control apparatus that controls an internal combustion engine that includes: a turbocharger which is provided in an intake passage, an actuator which changes an operating state of a turbocharger to adjust a turbocharging pressure, a throttle which is provided downstream relative to the turbocharger in the intake passage, and a catalyst having a NOx storage-reduction capacity which is provided in an exhaust passage, and that is an internal combustion engine which is capable of lean burn operation according to a predetermined air-fuel ratio that is leaner in fuel than a theoretical air-fuel ratio. The present control apparatus is configured so as to execute a rich spike during execution of the lean burn operation of the internal combustion engine. In the present disclosure, a rich spike is defined as a process that supplies a reducing agent to a catalyst by decreasing an air amount by means of a throttle and also making a combustion air-fuel ratio richer in fuel than a theoretical air-fuel ratio.

The present control apparatus is configured so that, when executing a rich spike in an operating region in which turbocharging is performed by a turbocharger, the control apparatus executes the rich spike by means of either quantity of state control among a first quantity of state control and a second quantity of state control. According to the first quantity of state control, a rich spike is executed while actuating an actuator so as to decrease a turbocharging pressure relative to a turbocharging pressure before execution of the rich spike, and after completion of the rich spike the actuator is actuated to raise the turbocharging pressure again, the combustion air-fuel ratio is adjusted to the theoretical air-fuel ratio while suppressing an air amount by means of the throttle until the turbocharging pressure is restored to a pressure that is equal to the turbocharging pressure before execution of the rich spike, and upon the turbocharging pressure being restored to a pressure that is equal to the turbocharging pressure before execution of the rich spike, the air amount is increased by means of the throttle and the combustion air-fuel ratio is returned to the predetermined air-fuel ratio for lean burn operation. According to the second quantity of state control, a rich spike is executed while actuating an actuator so as to maintain the turbocharging pressure at a pressure thereof prior to execution of the rich spike, and after completion of the rich spike the air amount is increased by means of the throttle and the combustion air-fuel ratio is returned to the predetermined air-fuel ratio for lean burn operation.

Because the first quantity of state control decreases the turbocharging pressure when executing a rich spike, in comparison to the second quantity of state control that maintains the turbocharging pressure, the opening degree of the throttle for obtaining the same air amount can be increased, and thus pumping loss can be reduced. However, according to the first quantity of state control, after completion of a rich spike, operation is performed using the theoretical air-fuel ratio as the combustion air-fuel ratio until the turbocharging pressure is restored, and consequently, in comparison to the second quantity of state control that rapidly switches to lean burn operation after completion of a rich spike, pumping loss increases because the opening degree of the throttle decreases. Hence, depending on the operating conditions of the internal combustion engine, in some cases execution of the first quantity of state control can reduce a fuel consumption quantity, while in other cases execution of the second quantity of state control can reduce the fuel consumption quantity.

Therefore, the present control apparatus is configured to select, between execution of the first quantity of state control and execution of the second quantity of state control, the one which results in a smaller fuel consumption quantity, in a case where a timing arrives for executing the rich spike in an operating region in which turbocharging by the turbocharger is performed. By selecting the quantity of state control that results in a smaller fuel consumption quantity, a decrease in fuel consumption performance that is caused by a rich spike can be suppressed.

The present control apparatus may comprise at least one processor, and at least one memory including at least one computer program, the at least one memory and the at least one computer program configured, with the at least one processor, to cause the present control apparatus at least to select, between execution of the first quantity of state control and execution of the second quantity of state control, the one which results in a smaller fuel consumption quantity, and execute the selected control.

Note that, as a specific method for selecting, a method may be adopted in which a first fuel quantity that is a fuel quantity that will be additionally consumed if the first quantity of state control is executed in comparison to continuing lean burn operation, and a second fuel quantity that is a fuel quantity that will be additionally consumed if the second quantity of state control is executed in comparison to continuing lean burn operation are respectively calculated, and execution of the second quantity of state control is selected in a case where the first fuel quantity is larger than the second fuel quantity, while execution of the first quantity of state control is selected in a case where the first fuel quantity is less than or equal to the second fuel quantity. By adopting such a selection method, a control method with good fuel consumption performance can be accurately selected.

According to the control apparatus of the present disclosure, regardless of whether the first quantity of state control or the second quantity of state control is selected, an air amount can be increased with good response when switching to lean burn operation after completion of a rich spike. Further, by selecting the quantity of state control which results in a smaller fuel consumption quantity among the first quantity of state control and the second quantity of state control, a decrease in fuel consumption performance due to a rich spike can be suppressed.

DETAILED DESCRIPTION OF THE PREFERRED EMBODIMENT

Embodiments of the present disclosure are described hereunder with reference to the accompanying drawings. However, it is to be understood that even when the number, quantity, amount, range or other numerical attribute of an element is mentioned in the following description of the embodiments, the present disclosure is not limited to the mentioned numerical attribute unless it is expressly stated or theoretically defined. Further, structures or steps or the like described in conjunction with the following embodiments are not necessarily essential to the present disclosure unless expressly stated or theoretically defined.

1. System Configuration of Embodiment

Figure 1:
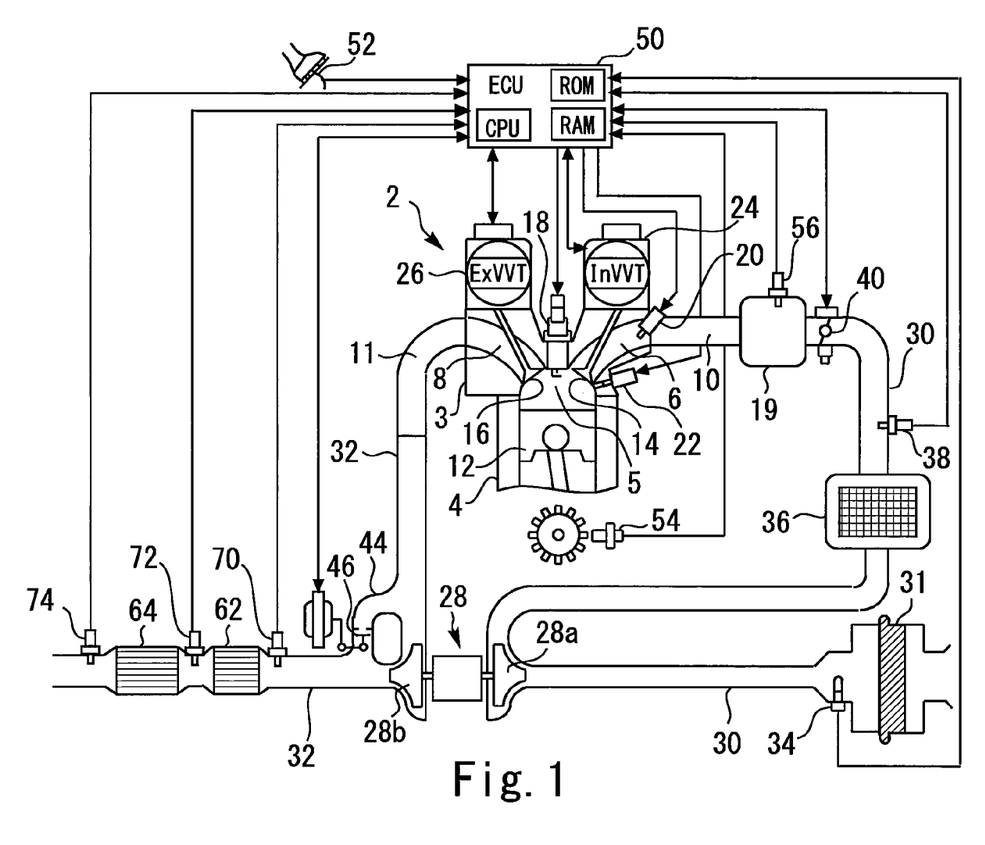
FIG. 1 is a view illustrating the configuration of a system according to an embodiment.

FIG. 1 is a view illustrating the configuration of a system according to an embodiment. The system according to the present embodiment includes an internal combustion engine (hereunder, referred to simply as "engine") 2 that is mounted as a power apparatus in an automobile. The engine 2 according to the present embodiment is a lean-burn engine which is capable of lean burn operation according to an air-fuel ratio that is leaner in fuel than a theoretical air-fuel ratio.

The engine 2 includes a cylinder block 4 in which a piston 12 is disposed and a cylinder head 3. A space that is defined between the cylinder head 3 and the piston 12 forms a combustion chamber 5. The engine 2 is a spark-ignition engine in which a spark plug 18 of an ignition device is installed in the cylinder head 3 so as to protrude into a top portion of the combustion chamber 5. An intake port 6 and an exhaust port 8 that are formed in the cylinder head 3 open in the combustion chamber 5, respectively. A communicating state between the combustion chamber 5 and the intake port 6 is controlled by an intake valve 14 that is provided in the cylinder head 3. A communicating state between the combustion chamber 5 and the exhaust port 8 is controlled by an exhaust valve 16 provided in the cylinder head 3. An in-cylinder injection valve 22 that injects fuel directly into the combustion chamber 5, and a port injection valve 20 that injects fuel into the intake port 6 are installed in the cylinder head 3.

In the configuration illustrated in FIG. 1, an intake variable valve train (InVVT) 24 that varies valve opening characteristics of the intake valve 14 and an exhaust variable valve train (ExVVT) 26 that varies valve opening characteristics of the exhaust valve 16 are provided in the engine 2. A known valve train that varies at least a valve timing and a working angle can be applied for these variable valve trains.

An intake manifold 10 is connected to the intake port 6. The intake manifold 10 includes a surge tank 19. An intake passage 30 that draws in air that from outside is connected to the surge tank 19. An electronically controlled throttle 40 is provided in the vicinity of the surge tank 19 in the intake passage 30. An air cleaner 31 is provided at a tip end of the intake passage 30. An air flow sensor 34 for measuring an intake air amount (fresh air amount) is installed in the vicinity of the air cleaner 31 in the intake passage 30. A turbocharging pressure sensor 38 for measuring a turbocharging pressure is installed between an intercooler 36 and the throttle 40 in the intake passage 30. An intake air pressure sensor 56 for measuring an intake air pressure is installed in the surge tank 19.

An exhaust manifold 11 is connected to the exhaust port 8. An exhaust passage 32 that discharges exhaust gas to outside is connected to the exhaust manifold 11. A start catalyst (hereunder, referred to as "S/C") 62 that is a three-way catalyst, and a NOx storage-reduction catalyst (hereunder, written as "NSR") 64 are arranged in that order from the upstream side in the exhaust passage 32. Under a lean atmosphere in which the oxygen concentration is high, the NSR 64 stores NOx that is contained in exhaust gas, in the form of nitrate. Subsequently, when HC, CO, $H_2$ or the like that serves as a reducing agent is supplied by means of a rich spike, the NSR 64 releases the stored NOx to cause the reducing agent and the NOx to react and thereby reduce the NOx. Air-fuel ratio sensors 70 and 72 are attached at an inlet side and an outlet side of the S/C 62. A NOx sensor 74 is attached at an outlet side of the NSR 64. Note that a selective reduction catalyst may further be arranged downstream of the NSR 64 in the exhaust passage 32.

The engine 2 has a turbocharger 28. A compressor 28a of the turbocharger 28 is provided upstream of the throttle 40 in the intake passage 30. The intercooler 36 that cools intake air that is compressed by the compressor 28a is provided between the compressor 28a and the throttle 40 in the intake passage 30.

A turbine 28b of the turbocharger 28 is provided upstream of the S/C 62 in the exhaust passage 32. A bypass passage 44 that bypasses the turbine 28b is provided in the exhaust passage 32. A waste gate valve (hereunder, written as "WGV") 46 is installed in the bypass passage 44. When the WGV 46 opens, one part of the exhaust gas flows through the bypass passage 44 and does not flow through the exhaust turbine 28b. The WGV 46 is driven by an electronically controlled actuator.

The system according to the present embodiment includes a control apparatus 50 that controls the engine 2. The control apparatus 50 is an ECU (electronic control unit) that has at least an input/output interface, a ROM, a RAM and a CPU. The input/output interface takes in sensor signals from various sensors mounted in the engine 2 and the vehicle, and also outputs actuating signals to actuators provided in the engine 2. The sensors that are connected to the control apparatus 50 include, in addition to the aforementioned sensors, an accelerator position sensor 52 for measuring a depression amount (accelerator opening degree) of an accelerator pedal, and a crank angle sensor 54 for measuring a crank angle of the engine 2. Various kinds of data including various programs and maps that are used to control the engine 2 are stored in the ROM. Various functions of the control apparatus 50 are realized by the CPU reading out programs from the ROM and executing the programs.

2. Operations of System of Embodiment

2-1. Lean Burn Operation

Figure 2:
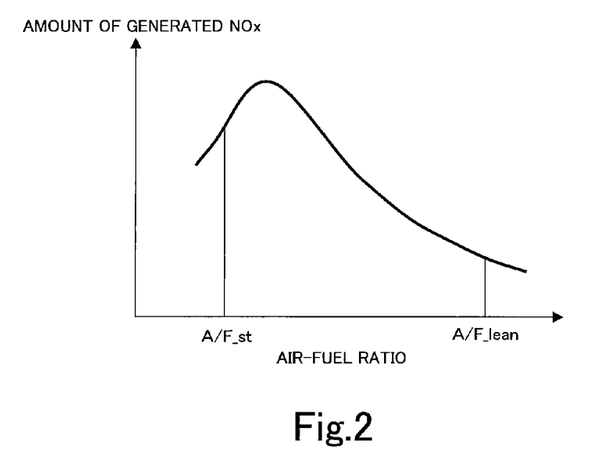
FIG. 2 is a view illustrating a relation between an amount of generated NOx and an air-fuel ratio.

In a case where an operating point of the engine 2 that is defined by the engine speed and engine torque is inside a previously specified operating region, the control apparatus 50 makes a combustion air-fuel ratio (air-fuel ratio of an air-fuel mixture that combusts inside a cylinder) an air-fuel ratio that is leaner in fuel than the theoretical air-fuel ratio and operates the engine 2. FIG. 2 is a view illustrating a relation between the generated amount of NOx and the air-fuel ratio. The generated amount of NOx becomes a maximum at an air-fuel ratio that is somewhat leaner in fuel than a theoretical air-fuel ratio A/F_st, and the generated amount of NOx decreases as the degree to which the air-fuel ratio is leaner in fuel than the theoretical air-fuel ratio A/F_st increases. The air-fuel ratio A/F_lean for lean burn operation is set to an air-fuel ratio that is made lean in fuel to a degree that is close to a misfire limit (for example, an air-fuel ratio around 25), and hence the generated amount of NOx is suppressed to a minimum.

An operating region in which turbocharging by the turbocharger 28 is performed, that is, a turbocharging region, is also included in an operating region in which lean burn operation is performed. In a case where the operating point of the engine 2 is not in the turbocharging region, lean burn operation is performed by port injection by the port injection valve 20 or by a combination of port injection and in-cylinder injection. In a case where the operating point of the engine 2 enters the turbocharging region, since blow-by of fuel that is caused by scavenging will occur if port injection is performed, lean burn operation is performed by in-cylinder injection by the in-cylinder injection valve 22.

2-2. Rich Spike

The control apparatus 50 intermittently executes a rich spike while lean burn operation is being executed. A rich spike is a process that, by decreasing the air amount by means of the throttle 40 and also making the combustion air-fuel ratio richer in fuel than the theoretical air-fuel ratio, supplies a reducing agent to the NSR 64 without varying the shaft torque of the engine 2. When a rich spike is executed, the fuel injection quantity per cycle is increased relative to a time of lean burn operation. The amount by which the fuel injection quantity is increased includes an amount corresponding to the reducing agent to be supplied to the NSR 64, and an amount corresponding to an increase in the pumping loss that is caused by reducing the opening degree of the throttle 40.

By making the combustion air-fuel ratio richer in fuel than the theoretical air-fuel ratio, the oxygen concentration of the exhaust gas is reduced and a large amount of reducing agents such as HC, CO and $H_2$ is produced. As a result of the exhaust gas that includes a large amount of reducing agents being supplied to the NSR 64, the atmosphere around the NSR 64 becomes a reducing atmosphere, and the NOx which is stored as nitrate is reduced to NO and is desorbed from the base. Thus, by executing a rich spike during lean burn operation, NOx which is stored in the NSR 64 can be desorbed therefrom, and the NOx storage performance of the NSR 64 can be restored. The NOx that desorbs from the NSR 64 as a result of the rich spike is reduced to $N_2$ or $NH_3$ on the NSR 64.

Figure 3:
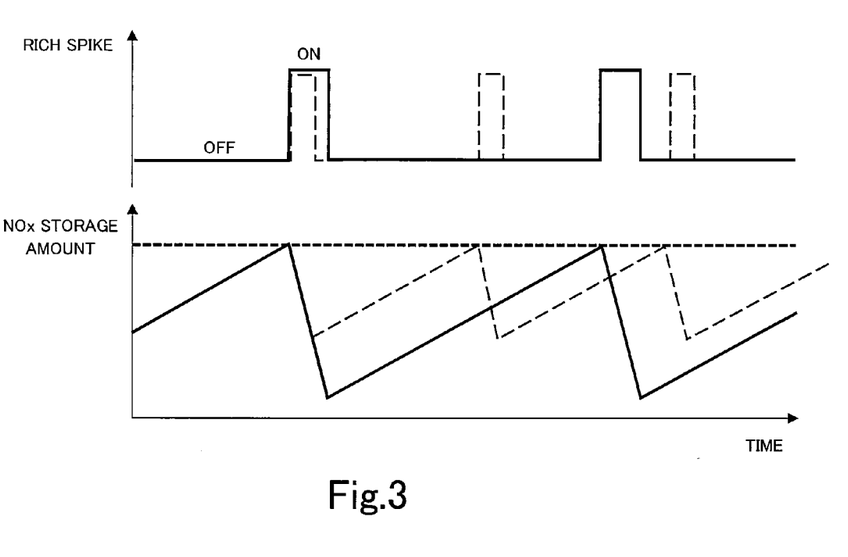
FIG. 3 is a view illustrating a relation between a NOx storage amount of an NSR, and a rich spike.

FIG. 3 is a view illustrating the relation between a NOx storage amount of the NSR 64 and a rich spike. In FIG. 3, a solid line represents changes over time in the NOx storage amount in a case where a rich spike execution time period is relatively long, and a broken line represents changes over time in the NOx storage amount in a case where the rich spike execution time period is relatively short. When the rich spike execution time period is made long, the amount of reducing agents supplied to the NSR 64 increases, and consequently restoration of the NOx storage capacity of the NSR 64 proceeds and a period until execution of the next rich spike lengthens. Therefore, if the rich spike execution time period is made long, although the fuel consumption quantity for each rich spike increases, the frequency of executing a rich spike can be lowered.

In a case where there is a request to perform a rich spike, the control apparatus 50 estimates the stored amount of NOx based on the operating history of the engine 2, such as the engine speed, the load and the air-fuel ratio, and determines the rich spike execution time period according to the estimated NOx storage amount. The most suitable relation between the NOx storage amount and the rich spike execution time period is mapped, and the mapped relation is stored in the ROM of the control apparatus 50. Note that, with respect to a request for a rich spike, in addition to a request from another control logic, a request for a rich spike also includes establishment of a condition for execution of a rich spike such as a NOx storage amount that is estimated based on the operating history of the engine 2 reaching a predetermined threshold value or a NOx concentration of exhaust gas that is measured by the NOx sensor 74 exceeding a predetermined threshold value.

2-3. Quantity of State Control for a Rich Spike

In a case where there is a request for a rich spike in the turbocharging region, the control apparatus 50 executes a rich spike by quantity of state control that is described hereunder. In addition to control of the combustion air-fuel ratio and control of the air amount, the quantity of state control for a rich spike also includes control of the turbocharging pressure. The control apparatus 50 is configured so as to selectively execute two kinds of quantity of state control for which the control methods are different, namely, a first quantity of state control and a second quantity of state control.

2-3-1. First Quantity of State Control

Figure 4:
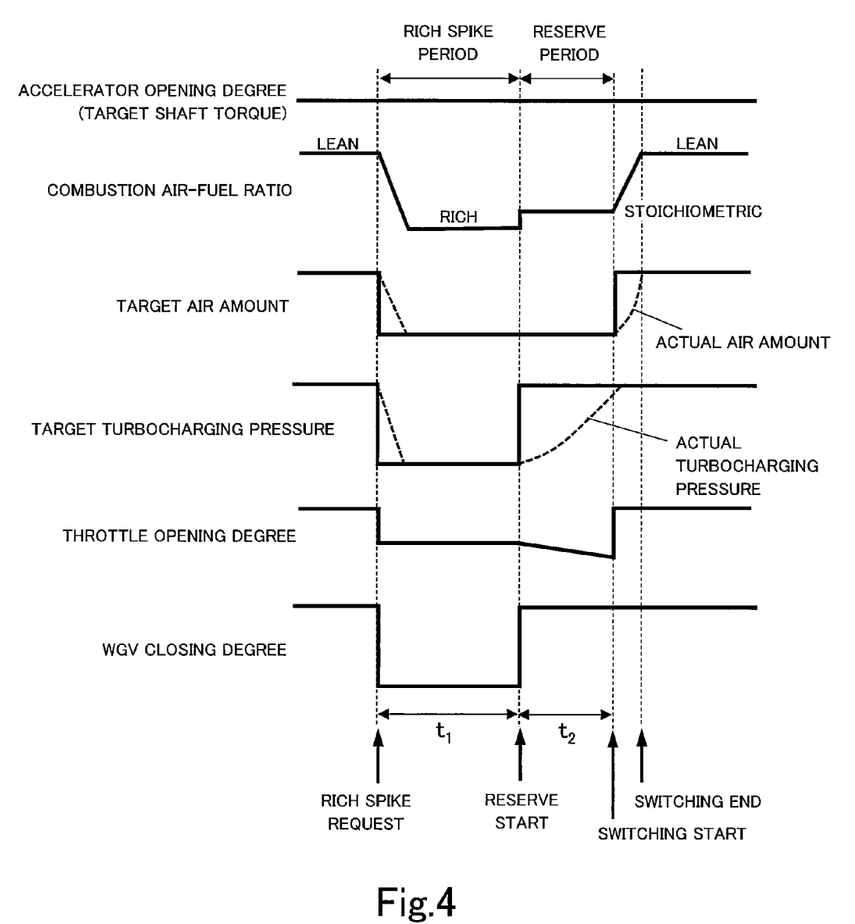
FIG. 4 is a timing chart for describing a first quantity of state control.

FIG. 4 is a timing chart that describes the first quantity of state control. In the timing chart, changes over time in the accelerator opening degree, the combustion air-fuel ratio, a target air amount, a target turbocharging pressure, a throttle opening degree and a WGV closing degree are shown in that order from the top. In the chart for the target air amount, along with the target air amount, changes over time in the actual air amount are shown by a broken line. In the chart for the target turbocharging pressure, along with the target turbocharging pressure, changes over time in the actual turbocharging pressure are shown by a broken line.

In the first quantity of state control, in a case where there is a request for a rich spike, the control apparatus 50 lowers the target air amount. The target air amount is determined based on a target torque and a target air-fuel ratio from a map in which the air-fuel ratio, air amount and torque are associated. The target torque is obtained by adding a predicted pumping loss that is predicted based on turbocharging pressure information and intake pipe pressure information to a target shaft torque that is determined according to an accelerator opening degree. The target air-fuel ratio is a target value of the combustion air-fuel ratio. In a case where there is a request for a rich spike, the target air-fuel ratio is switched from a set air-fuel ratio for lean burn operation to a predetermined air-fuel ratio that is richer in fuel (for example, an air-fuel ratio from around 12 to 14) than the theoretical air-fuel ratio. By switching the target air-fuel ratio in this way, the target air amount rapidly decreases in a discrete manner with regard to the values thereof prior to and after the request for a rich spike.

The control apparatus 50 determines an opening degree of the throttle 40 based on the target air amount. More specifically, the control apparatus 50 calculates a target intake pipe pressure based on the target air amount using a map or a model equation, and calculates the opening degree of the throttle 40 based on the actual turbocharging pressure that is measured by the turbocharging pressure sensor 38 and the target intake pipe pressure. For example, a model equation (nozzle equation) that defines the relation between the effective opening area of the throttle 40, pressure ratios before and after the throttle 40, and a flow rate of gas that passes through the throttle 40 are used to calculate the opening degree of the throttle 40. The control apparatus 50 actuates the throttle 40 according to the opening degree that is determined in this way. Because of a response delay in the air amount with respect to actuation of the throttle 40, when the target air amount rapidly decreases upon receiving a request for a rich spike, the actual air amount decreases with a delay relative to the target air amount.

Further, in a case where there is a request for a rich spike, the control apparatus 50 decreases the target turbocharging pressure at the same time as decreasing the target air amount. The target turbocharging pressure is basically set to a value obtained by adding a predetermined offset value to a target intake pipe pressure. Hence, when the target air amount rapidly decreases in a discrete manner, the target turbocharging pressure rapidly decreases in a discrete manner together with the target intake pipe pressure.

The control apparatus 50 determines the closing degree (degree of closing when fully open is taken as a reference) of the WGV 46 based on the target turbocharging pressure, and actuates the WGV 46 according to the closing degree that is determined. Specifically, a feedforward term of the WGV closing degree is determined by means of a map in which the turbocharging pressure and WGV closing degree are associated, and a feedback term of the WGV closing degree is determined based on a deviation between the target turbocharging pressure and the actual turbocharging pressure. Because of a response delay in the turbocharging pressure with respect to actuation of the WGV 46, when the target turbocharging pressure rapidly decreases upon receiving a request for a rich spike, the actual turbocharging pressure decreases with a delay relative to the target turbocharging pressure.

According to the first quantity of state control, during a period in which a rich spike is being executed, the target turbocharging pressure is maintained at a low value. However, when the rich spike ends, the target turbocharging pressure is rapidly increased in a discrete manner to the value thereof before execution of the rich spike, and not to a value that is determined based on the target intake pipe pressure. The WGV 46 is quickly closed upon the target turbocharging pressure being rapidly increased. Although the actual turbocharging pressure increases as a result of the WGV 46 being closed, because of the influence of so-called "turbo lag" the response delay when increasing the pressure is greater than when decreasing the pressure. Consequently, a certain amount of time is required for the actual turbocharging pressure to rise as far as the target turbocharging pressure.

In the first quantity of state control, after a rich spike ends, during a period until the turbocharging pressure is restored to the pressure thereof before execution of the rich spike, the combustion air-fuel ratio is maintained at the theoretical air-fuel ratio (stoichiometry) and the target air amount is maintained at the target air amount in the rich spike period. This period is a period for accumulating the turbocharging pressure, and is referred to hereunder as a "reserve period". As a result of the target air amount being maintained while, on the other hand, the actual turbocharging pressure increases, the opening degree of the throttle 40 that is calculated based on the actual turbocharging pressure and the target intake pipe pressure gradually decreases.

Further, when the actual turbocharging pressure reaches the target turbocharging pressure, the control apparatus 50 starts combustion switching from stoichiometric combustion to lean combustion according to a set air-fuel ratio. At the start of the combustion switching, the control apparatus 50 switches the target air-fuel ratio from the theoretical air-fuel ratio to the set air-fuel ratio for lean burn operation. As a result of this switching of the target air-fuel ratio, the target air amount that is determined based on the target torque and the target air-fuel ratio rapidly increases in a discrete manner. The throttle 40 is rapidly opened upon the target air amount being rapidly increased. Since the actual turbocharging pressure is already restored to the pressure thereof prior to execution of the rich spike, the air amount increases with good response as a result of the throttle 40 being rapidly opened. Consequently, combustion switching from stoichiometric combustion to lean combustion ends quickly. As shown in the aforementioned FIG. 2, although a region in which the amount of generated NOx rapidly increases exists between the set air-fuel ratio for lean burn operation and the theoretical air-fuel ratio, by quickly ending the combustion switching it is possible to decrease the dwelling time in this region and suppress the amount of NOx emissions.

Figure 6:
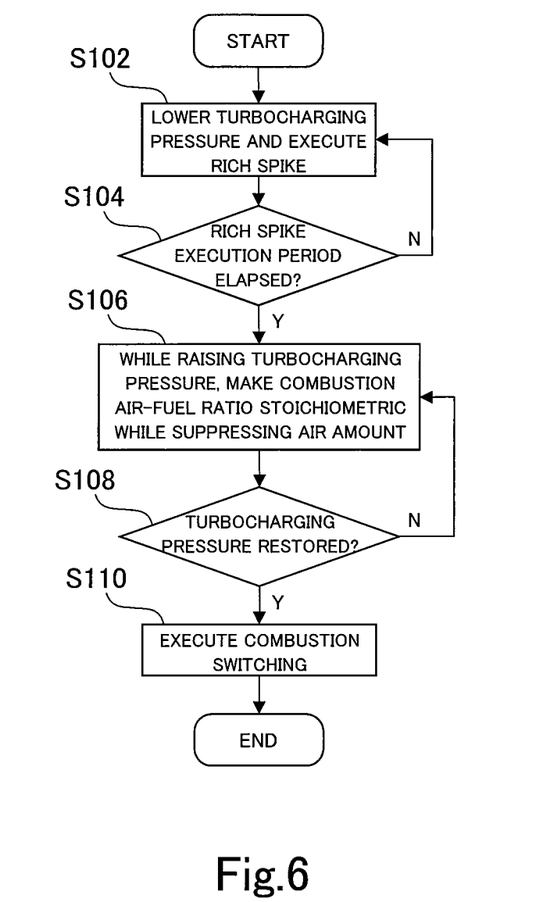
FIG. 6 is a flowchart illustrating a control flow of the first quantity of state control.

A control flow of the first quantity of state control that is described above is represented by a flowchart illustrated in FIG. 6. A program represented by such a control flow is stored in the ROM of the control apparatus 50.

In step S102 of the flowchart in FIG. 6, execution of a rich spike is performed while actuating the WGV 46 so as to decrease the turbocharging pressure relative to the pressure thereof before the request for the rich spike. Next, in step S104, it is determined whether or not an execution period of the rich spike that is determined in accordance with the estimated NOx storage amount has elapsed. The processing in step S102 and step S104 is repeated until the execution period elapses.

When the execution period of the rich spike elapses, in step S106 the control apparatus 50 actuates the WGV 46 so as to again raise the turbocharging pressure, and also adjusts the combustion air-fuel ratio to the theoretical air-fuel ratio while suppressing an air amount by means of the throttle 40 so as not to cause the shaft torque of the engine 2 to vary. Next, in step S108, it is determined whether or not the turbocharging pressure is restored to the turbocharging pressure before execution of the rich spike that is the target turbocharging pressure. The processing in step S106 and step S108 is repeated until the turbocharging pressure is restored.

Further, when the turbocharging pressure is restored, in step S110, combustion switching is performed, that is, the throttle 40 is opened to increase the air amount and the combustion air-fuel ratio is returned to the set air-fuel ratio for lean burn operation.

2-3-2. Second Quantity of State Control

Figure 5:
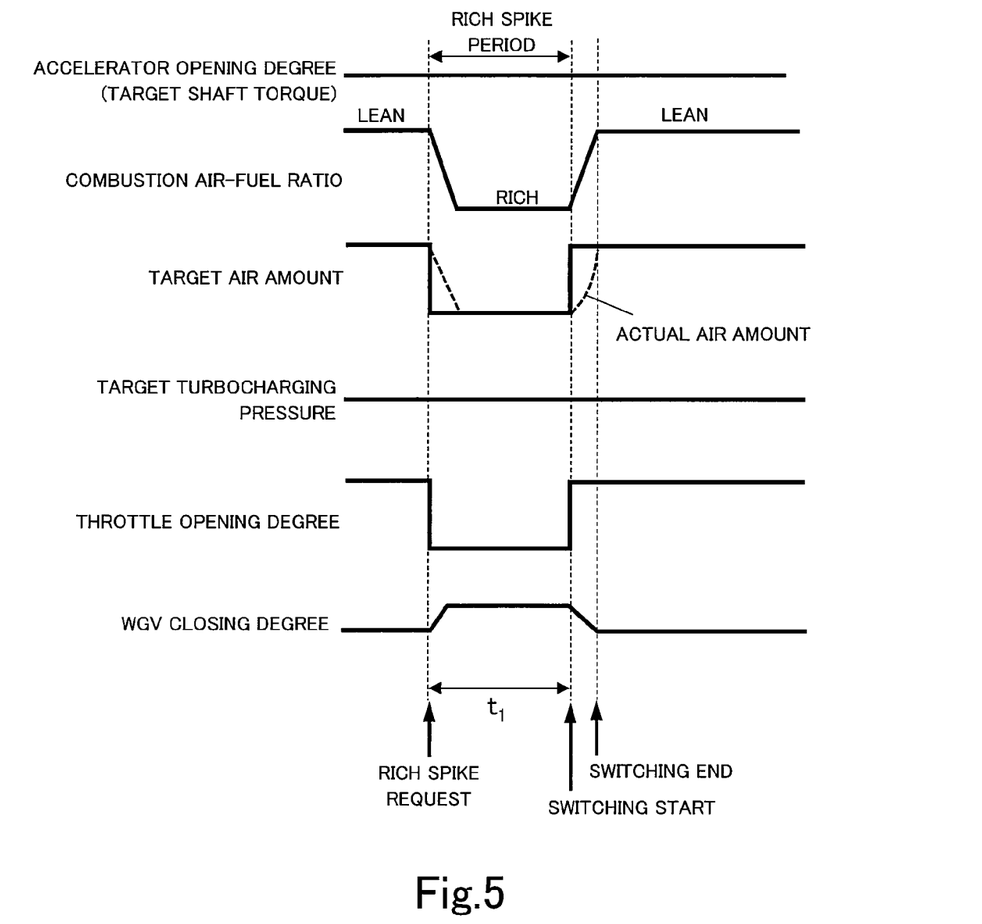
FIG. 5 is a timing chart for describing a second quantity of state control.

FIG. 5 is a timing chart that describes the second quantity of state control. In the timing chart, changes over time in the accelerator opening degree, the combustion air-fuel ratio, the target air amount, the target turbocharging pressure, the throttle opening degree and the WGV closing degree are shown in that order from the top. In the chart for the target air amount, together with the target air amount, changes over time in the actual air amount are shown by a broken line. In the chart for the target turbocharging pressure, together with the target turbocharging pressure, changes over time in the actual turbocharging pressure are shown by a broken line.

According to the second quantity of state control, in a case where there is a request for a rich spike, although the control apparatus 50 lowers the target air amount, the target turbocharging pressure is maintained at the turbocharging pressure before the request for a rich spike. The control apparatus 50 determines the opening degree of the throttle 40 based on the actual turbocharging pressure that is measured by the turbocharging pressure sensor 38 and the target intake pipe pressure that is calculated based on the target air amount, and actuates the throttle 40 in accordance with the determined opening degree. Because the turbocharging pressure is maintained at a high level, the opening degree of the throttle 40 is made smaller in comparison to the first quantity of state control in which the turbocharging pressure is lowered. Further, the control apparatus 50 determines the closing degree of the WGV 46 according to the target turbocharging pressure, and actuates the WGV 46 according to the closing degree that is determined. During the period of a rich spike, a turbine flow rate decreases because the air amount is lowered. Consequently, by an action of feedback control, the closing degree of the WGV 46 is made larger than before the request for a rich spike.

Note that, in the second quantity of state control also, the target air amount is determined based on the target torque and target air-fuel ratio by means of a map that associates the air-fuel ratio, air amount and torque. Further, in the second quantity of state control also, the target torque is obtained by adding a predicted pumping loss that is predicted based on turbocharging pressure information and intake pipe pressure information to a target shaft torque that is determined according to an accelerator opening degree. However, in the second quantity of state control, because the turbocharging pressure is maintained at a higher pressure and the opening degree of the throttle 40 is made smaller relative to the first quantity of state control, a pumping loss that arises becomes larger relative to a time of executing the first quantity of state control. Consequently, in the second quantity of state control, compared to the first quantity of state control, the target torque during a rich spike increases by an amount corresponding to an increase in the predicted pumping loss, and the fuel consumption quantity during the rich spike also increases.

According to the second quantity of state control, after the end of a rich spike, combustion switching from stoichiometric combustion to lean combustion according to a set air-fuel ratio is started. At the start of the combustion switching, the control apparatus 50 switches the target air-fuel ratio from a set air-fuel ratio for a rich spike to the set air-fuel ratio for lean burn operation. As a result of this switching of the target air-fuel ratio, the target air amount that is determined based on the target torque and the target air-fuel ratio rapidly increases discretely. The throttle 40 is quickly opened upon the target air amount being rapidly increased. Since the turbocharging pressure is maintained during the rich spike also, the air amount increases with good response as a result of the throttle 40 being quickly opened. By this means, combustion switching from stoichiometric combustion to lean combustion ends quickly.

Figure 7:
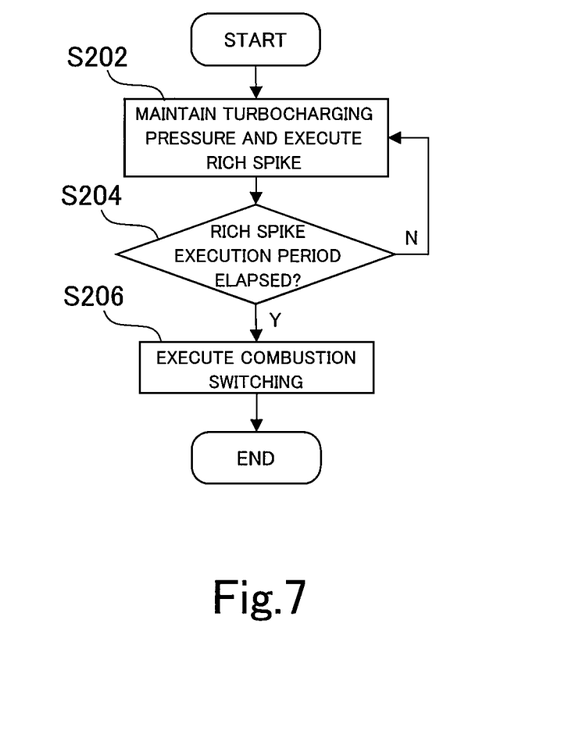
FIG. 7 is a flowchart illustrating a control flow of the second quantity of state control.

A control flow of the second quantity of state control that is described above is represented by a flowchart illustrated in FIG. 7. A program represented by such a control flow is stored in the ROM of the control apparatus 50.

In step S202 of the flowchart in FIG. 7, execution of a rich spike is performed while actuating the WGV 46 so as to maintain the turbocharging pressure at the same pressure as prior to the request for the rich spike. Next, in step S204, it is determined whether or not an execution period of the rich spike that is determined in accordance with the estimated NOx storage amount has elapsed. The processing in step S202 and step S204 is repeated until the execution period elapses.

Further, when the execution period of the rich spike elapses, in step S206, combustion switching is performed, that is, the throttle 40 is opened to increase the air amount and the combustion air-fuel ratio is returned to the set air-fuel ratio for lean burn operation.

2-3-3. Selection of Quantity of State Control

When the above described two kinds of quantity of state control are compared, it is found that each kind of quantity of state control has advantages & disadvantages with respect to fuel consumption performance. Specifically, according to the first quantity of state control, since the turbocharging pressure is decreased when executing a rich spike, in comparison to the second quantity of state control that maintains the turbocharging pressure at the same level as before execution of the rich spike, the opening degree of the throttle 40 for obtaining the same air amount can be increased. Since this decreases the pumping loss, it is advantageous in terms of fuel consumption performance.

However, on the other hand, according to the first quantity of state control, because a reserve period is provided after the end of a rich spike, the period in which the opening degree of the throttle 40 is small continues in comparison to the second quantity of state control which performs combustion switching immediately after the end of a rich spike. This causes the pumping loss to increase, and is disadvantageous in terms of fuel consumption performance.

That is, which control among the first quantity of state control and the second quantity of state control is advantageous in terms of fuel consumption performance depends on the circumstances. In a case where there is a request for a rich spike in a turbocharging region, the control apparatus 50 determines based on the operating conditions of the engine 2 which control among the first quantity of state control and the second quantity of state control will result in a smaller fuel consumption quantity, and selects the control that will result in the smaller fuel consumption quantity. More specifically, the control apparatus 50 calculates a fuel quantity (first fuel quantity) that, if the first quantity of state control is executed, will be additionally consumed in comparison to continuing lean burn operation, and also calculates a fuel quantity (second fuel quantity) that, if the second quantity of state control is executed, will be additionally consumed in comparison to continuing lean burn operation, and compares the two fuel quantities that are calculated.

A first fuel quantity Q1 and a second fuel quantity Q2 can be respectively calculated by the following equations.

$$Q1 = (q\_rich1 - q\_lean) \times t1 + (q\_st - q\_lean) \times t2 \qquad \text{Equation 1}$$

$$Q2 = (q\_rich2 - q\_lean) \times t1 \qquad \text{Equation 2}$$

In the above equations, t1 represents the length of the rich spike period, and this is a common value between the first quantity of state control and the second quantity of state control. The length of the rich spike period is calculated according to the estimated NOx storage amount. Further, t2 represents the length of the reserve period according to the second quantity of state control. The length of the reserve period is an adaptive value that is obtained by the actual machine, and is mapped in association with the engine speed and torque.

In the above equation, q_rich1 represents a fuel injection quantity per unit of time in the rich spike period according to the first quantity of state control. Similarly, q_rich2 represents a fuel injection quantity per unit of time in the rich spike period according to the second quantity of state control. Further, q_st represents a fuel injection quantity per unit of time in the reserve period according to the first quantity of state control. Note that, as described above, during the reserve period the combustion air-fuel ratio is set to the theoretical air-fuel ratio. Further, q_lean represents a fuel injection quantity per unit of time during lean burn operation. Each of q_rich1, q_rich2, q_st, and q_lean can be calculated based on the target air-fuel ratio and the target air amount (calculated based on the target torque and the target air-fuel ratio). The target torque that is a basis for calculating q_rich2 is larger by an amount corresponding to a difference in the pumping loss, relative to the target torque that is a basis for calculating q_rich1. Consequently, when q_rich1 and q_rich2 are compared, q_rich2 is larger by the amount corresponding to the difference in the pumping loss that is included in the target torque.

In a case where the first fuel quantity Q1 calculated by the above described Equation 1 is greater than the second fuel quantity Q2 calculated by the above described Equation 2, the control apparatus 50 selects execution of the second quantity of state control, whereas if the first fuel quantity Q1 is less than or equal to the second fuel quantity Q2, the control apparatus 50 selects execution of the first quantity of state control. Note that, determining which is larger and smaller among the first fuel quantity Q1 and the second fuel quantity Q2 is equivalent to determining the correctness of the following inequality. Therefore, which of the quantity of state controls to execute may also be determined according to the correctness of the following inequality.

$$(q\_rich2 - q\_rich1) \times t1 - (q\_st - q\_lean) \times t2 > 0 \qquad \text{Equation 3}$$

Figure 8:
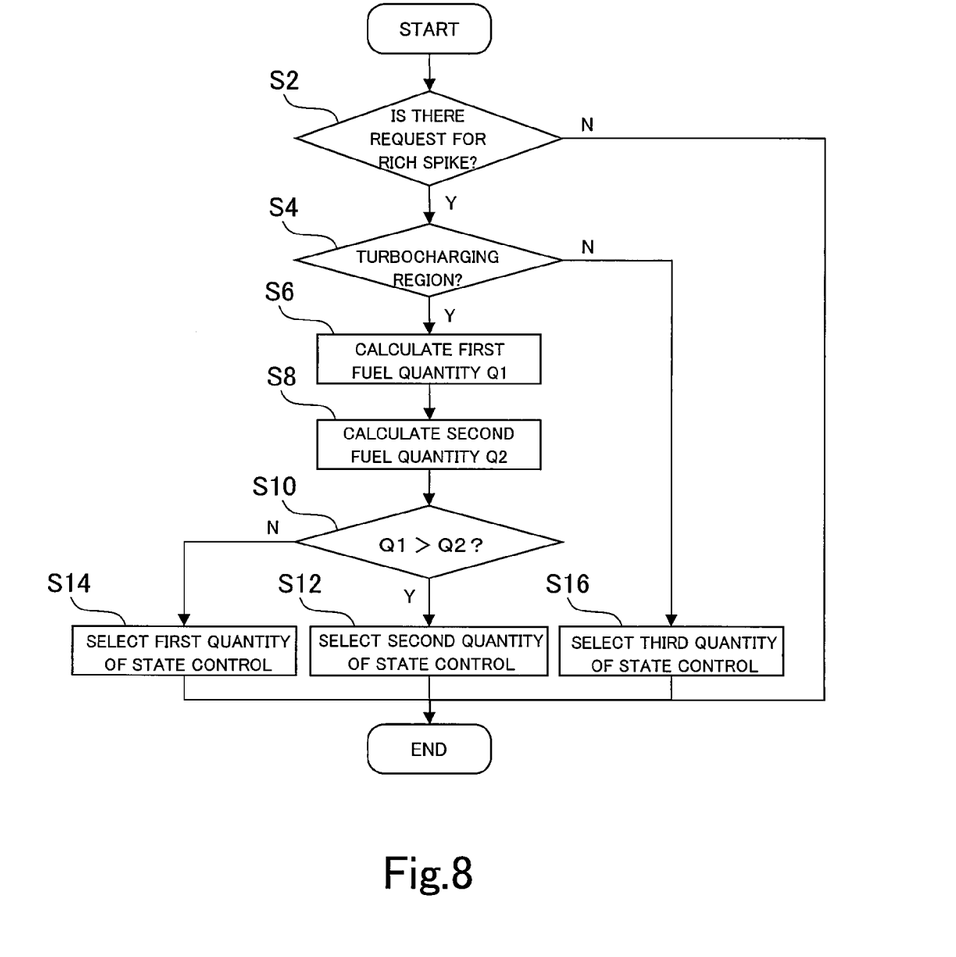
FIG. 8 is a flowchart illustrating procedures for selecting a control method.

The selection procedures of the above described control method can be represented by a flowchart in FIG. 8. A program for executing the processing and performing the determinations shown in the flowchart in FIG. 8 is stored on the ROM of the control apparatus 50. During a period in which lean burn operation is being performed, the control apparatus 50 repeatedly executes the processing and performs the determinations shown in the flowchart in FIG. 8 for each predetermined control period.

In step S2 in the flowchart in FIG. 8, the control apparatus 50 determines the existence/non-existence of a request for a rich spike. It is determined that a request for a rich spike exists if a condition for executing a rich spike is satisfied, such as a concentration of NOx downstream of the NSR 64 that is measured by the NOx sensor 74 exceeding a threshold value, or a NOx storage amount of the NSR 64 that is calculated by estimation based on the engine speed, torque and air-fuel ratio exceeding a threshold value, or if there is a request from another control logic. If there is not a request for a rich spike, the following processing and determinations are skipped.

In a case where there is a request for a rich spike, in step S4 it is determined whether or not the operating point of the engine 2 is in the turbocharging region. If the operating point of the engine 2 is not in the turbocharging region, execution of a third quantity of state control is selected in step S16. Although the third quantity of state control is not described above, execution of the third quantity of state control means executing a normal rich spike that is not accompanied by turbocharging pressure control. That is, a reducing agent is supplied to the NSR 64 without varying the shaft torque of the engine 2, by decreasing the air amount by means of the throttle 40 and making the combustion air-fuel ratio richer in fuel than the theoretical air-fuel ratio.

If the operating point of the engine 2 is in the turbocharging region, in step S6 the first fuel quantity Q1 is calculated, and in step S8 the second fuel quantity Q2 is calculated. The order of step S6 and step S8 may be reversed. In step S10 it is determined whether or not the first fuel quantity Q1 is larger than the second fuel quantity Q2.

If the first fuel quantity Q1 is greater than the second fuel quantity Q2, execution of the second quantity of state control is selected in step S12. In contrast, if the first fuel quantity Q1 is less than or equal to the second fuel quantity Q2, execution of the first quantity of state control is selected in step S14. By selecting the quantity of state control which results in the smaller fuel consumption quantity in this manner, a decrease in fuel consumption performance due to a rich spike can be suppressed.

3. Other Embodiments

The quantity of state control among the first quantity of state control and the second quantity of state control which results in the smaller fuel consumption quantity may be calculated for each operating point of the engine, and the results may be mapped in association with the engine speed and the torque. That is, a configuration may be adopted in which, instead of calculating and comparing fuel quantities each time as in the above described embodiment, which quantity of state control among the first quantity of state control and the second quantity of state control to select is determined according to a map, based on the engine speed and target torque at a time that the rich spike is requested.

The rich spike execution time period may be fixed to a definite period of time (for example, 3 seconds), instead of being determined based on an estimated NOx storage amount. Instead of the reserve period being defined in advance in a map as in the above described embodiment, a configuration may be adopted in which the turbocharging pressure is monitored and the reserve period is determined as a period until the turbocharging pressure reaches a predetermined value.

In the above described embodiment, the waste gate valve 46 is provided as an actuator that changes the operating state of the turbocharger to adjust the turbocharging pressure. If the turbocharger is a variable displacement turbocharger equipped with a variable nozzle, the variable nozzle corresponds to such an actuator. Further, if the turbocharger is an electric turbocharger in which the compressor is driven with an electric motor, the electric motor corresponds to such an actuator.

The invention claimed is:

1. An internal combustion engine comprising:
a turbocharger having a compressor provided in an intake passage and a turbine provided in an exhaust passage,
a turbine wastegate having an actuator which changes an operating state of the turbocharger to adjust a turbocharging pressure,
a throttle provided downstream relative to the compressor of the turbocharger in the intake passage,
a catalyst having a NOx storage-reduction capacity provided in the exhaust passage,
wherein the internal combustion engine is executed in a lean burn operation according to a predetermined air-fuel ratio that is leaner in fuel than a theoretical air-fuel ratio, and
a control apparatus including a processor, memory, and at least input/output interface configured to:
execute a rich spike in the internal combustion engine during the lean burn operation, which includes supplying a reducing agent to the catalyst, by closing the throttle to decrease an aft amount, and increasing a combustion air-fuel ratio being richer in fuel than the theoretical air-fuel ratio, and
when the rich spike in the internal combustion engine is executed in an operating region in which the turbocharger generates turbocharging pressure, select one of an execution of a first quantity of state control and an execution of a second quantity of state control to result in a smaller fuel consumption quantity, wherein
in the first quantity of state control executing the rich spike of the internal combustion engine, the control apparatus actuates the actuator of the turbine wastegate to decrease the turbocharging pressure relative to the turbocharging pressure before execution of the rich spike of the internal combustion engine, and
after completion of the rich spike, the control apparatus actuates the actuator of the turbine wastegate to increase the turbocharging pressure again,
adjusts the combustion air-fuel ratio to the theoretical air-fuel ratio while suppressing an aft amount by closing the throttle until the turbocharging pressure is restored to a pressure that is equal to the turbocharging pressure before execution of the rich spike, and
increases the air amount by opening the throttle and having the combustion air-fuel ratio being to the predetermined air-fuel ratio upon the turbocharging pressure being restored to the pressure that is equal to the turbocharging pressure before execution of the rich spike, and
in the second quantity of state control executing the rich spike of the internal combustion engine, the control apparatus actuates the actuator of the turbine wastegate to maintain the turbocharging pressure at a pressure thereof prior to execution of the rich spike of the internal combustion engine, and
after completion of the rich spike, the control apparatus adjusts the throttle to increase the air amount and to have the combustion air-fuel ratio being the predetermined air-fuel ratio.

2. The internal combustion engine according to claim 1, wherein the control apparatus is further configured, in selecting the one of the execution of the first quantity of state control and the execution of the second quantity of state control, to
calculate a first fuel quantity being an additional fuel quantity consumed by the internal combustion engine if the first quantity of state control is executed in comparison to continuing the lean burn operation,
calculate a second fuel quantity being an additional fuel quantity consumed by the internal combustion engine if the second quantity of state control is executed in comparison to continuing the lean burn operation, and
select the execution of the second quantity of state control when the first fuel quantity is larger than the second fuel quantity, and
select the execution of the first quantity of state control when the first fuel quantity is less than or equal to the second fuel quantity.

* * * * *